Jan. 29, 1946.   W. L. HOFF ET AL   2,393,684
TESTING METHOD
Filed April 9, 1943
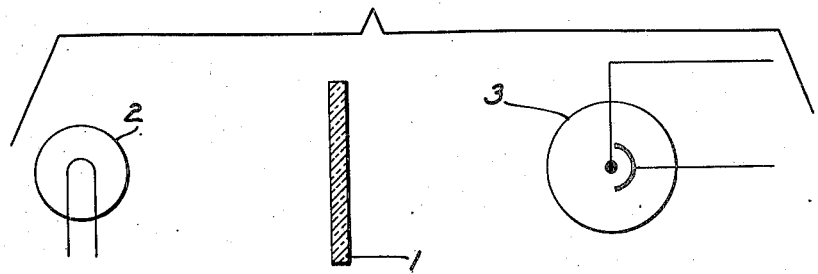
INVENTORS
W. L. HOFF
L. I. SHAW
BY *Harry L. Duft*
ATTORNEY Patented Jan. 29, 1946

2,393,684

UNITED STATES PATENT OFFICE 2,393,684

TESTING METHOD

Wilbur L. Hoff, Hollywood, and Leon I. Shaw, Oak Park, Ill., assignors to Western Electric Company, Incorporated, New York, N. Y., a corporation of New York Application April 9, 1943, Serial No. 482,446

10 Claims. (Cl. 23—230)

This invention relates to a testing method and more particularly to a method of determining the etching power of acid etching solutions.

In the manufacture of crystals for use in electrical apparatus, quartz crystals are etched for various reasons, among them being the determination of the crystalline structure thereof, and also to promote the adherence of other materials to the crystals. The etching of the crystal must be very closely regulated in order to render the crystals suitable for use, without repetition of some processing steps.

Objects of the present invention are to provide a simple and safe method of quickly determining the etching power of an etching solution and determining the per cent of acid in a solution.

In accordance with one embodiment of the invention, an etching solution is tested to determine its etching power by immersing a sand blasted piece of glass in the solution for a predetermined length of time and measuring the degree of translucence of the glass before and after the immersion in the etching bath.

A better understanding of the invention may be had by reference to the following brief description of the method when considered in conjunction with the accompanying drawing, wherein the single figure illustrates diagrammatically the simple apparatus necessary in practicing the invention.

In one embodiment of the invention, a number of pieces of flat glass of suitable size, for example, microscope slides, as illustrated by the slide or plate 1, are sand blasted to render them more resistant to the passage of light through them. After the plates have been sand blasted, they are placed in position between a light source 2 and a photometer 3, whereby readings on the photometer will indicate the amount of light passing through the plates. The plates which have the desired degree of opacity are then selected to be used as testing samples for determining the etching power of a hydrofluoric acid etching solution. Since only those plates having the desired amount of resistance to the passage of light through them are selected as test samples and have opacity to a known degree, these plates may be dipped in an etching bath comprising hydrofluoric acid for a definite time depending on the equipment being used and the properties desired, for example, one minute±one second. The test sample may then be thoroughly rinsed, for example, by dipping it in alcohol, and dried, after which its light transmission is measured by some suitable means, such as by placing it between the light source 2 and photometer 3, to determine the degree of transmission of light of the test sample. In the etching bath, the sand-blasted surface will, of course, be etched and a deposit will form on the surface which has been sand blasted, whereby the amount of light transmitted through the plate 1 will be less than passed through it before dipping it in the acid bath in spite of the fact that the hydrofluoric acid gives a bright etch. The reading of the photometer may then be compared with the reading made previous to dipping the test sample in the etching bath and the strength of the etching bath may then be thus determined and suitable tables may be compiled to indicate the etching power of the etching bath when a given reading is indicated by the photometer.

While in the preferred embodiment of the process as just described, the plates which have been dipped in the acid bath are placed between the light source 2 and the photometer 3 without any further treatment of the test sample, the invention may be practiced by scrubbing and washing the sand-blasted surface of the test sample after the test sample has been dipped in the etching bath and, when this process is followed, more light will be passed through the test sample after it has been dipped in the etching solution than passed through it before dipping it in the etching solution and readings may be taken on the photometer which will indicate the etching power of the etching solution.

The description of the embodiments of the invention contained hereinbefore have been limited to a discussion of the method as a means for determining the etching power of hydrofluoric acid, but it will be apparent that the per cent of hydrofluoric acid in a solution thereof may be determined by following the exact steps described and simply interpreting the results of tests in terms of per cent of hydrofluoric acid rather than in terms of the etching power of a solution.

What is claimed is:

1. A method of determining the etching power of etching solutions which comprises sand-blasting a surface of a test sample, determining the translucence of the sand-blasted test sample, dipping the test sample for a predetermined time in the etching solution, determining the translucence of the test sample after dipping it in the etching solution, comparing the results of the two tests to determine to what extent the translucence of the sample has been changed, and comparing the result of said comparison with known standards determined by testing in the same manner solutions of known etching powers.

2. A method of determining the etching power of etching solutions which comprises sand-blasting a surface of a test sample, determining the translucence of the sand-blasted test sample, dipping the test sample for a predetermined time in the etching solution, determining the translucence of the test sample after dipping it in the etching solution, and determining the etching power of the etching solution in accordance with the difference in light transmission of the sample before and after dipping it in the solution by comparing the resultant difference in light transmission with the difference effected by testing a sample in the same manner in a solution of known etching power.

3. A method of determining the etching power of etching solutions which comprises dipping a sand-blasted test sample in the etching solution for a predetermined time, measuring the loss in translucence of the sample after dipping it, and comparing the result of said measurement with known standards determined by testing samples in the same manner in solutions of known etching powers.

4. A method of determining the etching power of etching solutions which comprises measuring the translucence of a sand-blasted test sample, dipping the sample in the etching solution for a predetermined time, again measuring the translucence of the sample, comparing the translucence of the sample before dipping with its translucence after dipping to determine to what extent the translucence of the test sample has been changed, and comparing the result of said comparison with known standards determined by testing in the same manner solutions of known etching powers.

5. A method of determining the etching power of etching solutions which comprises sand-blasting a surface of a glass slide, determining the translucence of the sand-blasted slide, dipping the slide for a predetermined time in the etching solution, determining the translucence of the slide after dipping it in the etching solution, comparing the results of the two tests to determine to what extent the translucence of the slide has been changed, and comparing the result of said comparison with known standards determined by testing in the same manner solutions of known etching powers.

6. A method of determining the etching power of etching solutions which comprises sand-blasting a surface of a glass slide, determining the translucence of the sand-blasted slide, dipping the slide for a predetermined time in the etching solution, determining the translucence of the slide after dipping it in the etching solution, and determining the etching power of the etching solution in accordance with the difference in light transmission of the slide before and after dipping it in the solution by comparing the resultant difference in light transmission with the difference effected by testing a similar slide in the same manner in solutions of known etching powers.

7. A method of determining the etching power of etching solutions which comprises dipping a sand-blasted glass slide in the etching solution to form a film thereover, measuring the loss in translucence of the slide after dipping it, and comparing said loss in translucence with the loss in translucence of a similar slide tested in the same manner in a solution of known etching power.

8. A method of determining the etching power of etching solutions which comprises measuring the translucence of a sand-blasted glass plate, dipping the sample in the etching solution for a predetermined time, again measuring the translucence of the slide, comparing the translucence of the slide before dipping with its translucence after dipping to determine to what extent the translucence of the plate has been changed, and comparing the result of said comparison with known standards determined by testing in the same manner solutions of known etching power.

9. A method of determining quantitatively the per cent of hydrofluoric acid in a solution of hydrofluoric acid which comprises abrading a surface of a test sample, dipping the test sample for a predetermined time in the solution, determining the difference in translucence of the test sample before and after it is dipped in the acid solution, and comparing the difference in translucence with the difference in the translucence of a test sample before and after the test sample has been dipped for the same period of time in solutions containing known percentages of hydrofluoric acid.

10. A method of determining quantitatively the per cent of hydrofluoric acid in a solution of hydrofluoric acid which comprises sand-blasting a surface of a piece of glass, determining the translucence of the sand-blasted piece of glass, dipping the piece of glass for a predetermined time in the acid solution, comparing the translucence of the piece of glass before and after it is dipped in the acid solution to determine to what extent the translucence of the glass plate has been changed, and comparing the result of said comparison with known standards determined by testing for the same period of time solutions containing known percentages of hydrofluoric acid.

WILBUR L. HOFF.
LEON I. SHAW.